United States Patent [19]
Dedolph

[11] 3,973,353
[45] Aug. 10, 1976

[54] PLANT GROWTH ACCELERATING APPARATUS

[75] Inventor: Richard R. Dedolph, Naperville, Ill.

[73] Assignee: Gravi-Mechanics Co., Naperville, Ill.

[22] Filed: May 29, 1974

[21] Appl. No.: 474,269

[52] U.S. Cl. .................................... 47/1.2; 47/38; 47/37; 47/58; 47/39
[51] Int. Cl.² ..................... A01G 31/02; A01G 9/10
[58] Field of Search .................... 47/1.2, 17, 38–39, 47/58, 34, 37, 56

[56] References Cited
UNITED STATES PATENTS

| | | | |
|---|---|---|---|
| 2,244,677 | 6/1941 | Cornell | 47/17 |
| 3,172,234 | 3/1965 | Eavis | 47/1.2 |
| 3,254,447 | 6/1966 | Ruthner | 47/1.2 |
| 3,336,129 | 8/1967 | Herrett et al. | 47/DIG. 7 |
| 3,352,057 | 11/1967 | Ferrand | 47/1.2 |
| 3,362,106 | 1/1968 | Goldring | 47/56 |
| 3,373,009 | 3/1968 | Pruitt et al. | 47/DIG. 7 |
| 3,380,190 | 4/1968 | Granger | 47/58 |
| 3,472,644 | 10/1969 | Woodside et al. | 47/37 X |
| 3,529,379 | 9/1970 | Ware | 47/17 |
| 3,834,072 | 9/1974 | Rack | 47/56 |

FOREIGN PATENTS OR APPLICATIONS

| | | |
|---|---|---|
| 250,093 | 2/1966 | Austria |
| 722,589 | 11/1965 | Canada |
| 7,014,511 | 4/1971 | Netherlands |

Primary Examiner—Robert E. Bagwill
Attorney, Agent, or Firm—Prangley, Dithmar, Vogel, Sandler & Stotland

[57] ABSTRACT

A plant growth accelerating apparatus for increasing plant yields by effectively removing the growing plants from the constraints of gravity and increasing the plant yield per unit of space when the light intensity incident on the apparatus varies, and including a plant bed mounted for turning about the longitudinal axis thereof and a drive structure for periodically tilting the longitudinal axis of the plant bed while relatively low light intensities are incident thereon to impart thereto a slope from about 0.01 to about 0.25 to decrease the respiration rate of plants growing on the plant bed; there also is disclosed a structure applying the tilting structure to a multiple plant bed machine, as well as gravitational watering structure for multiple plant beds while turning the same, and improved plant bed structures and novel forms and compositions of rooting media and methods of making the same.

40 Claims, 23 Drawing Figures

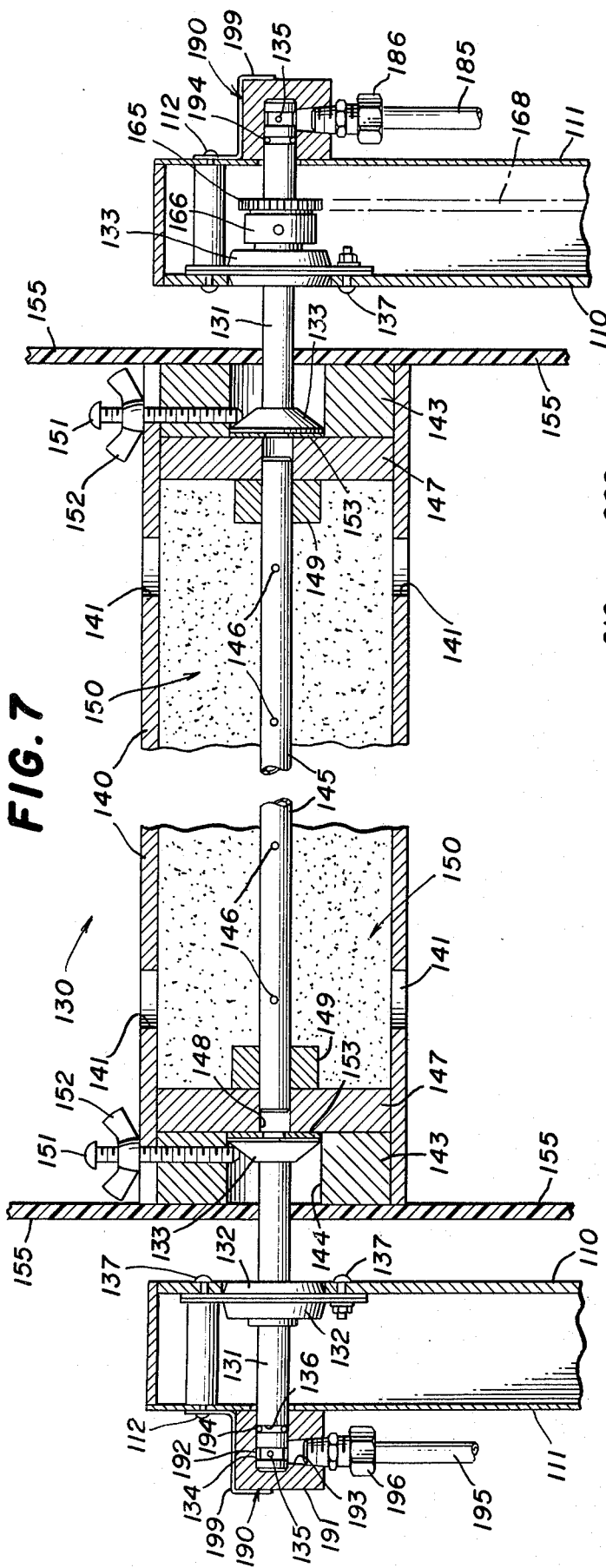
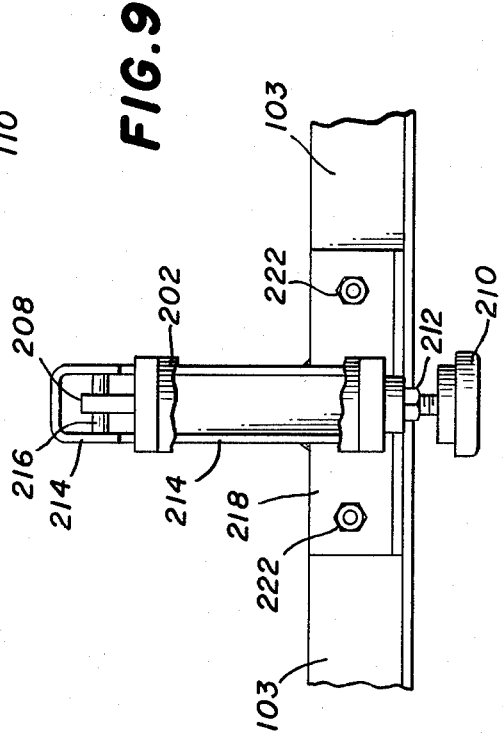
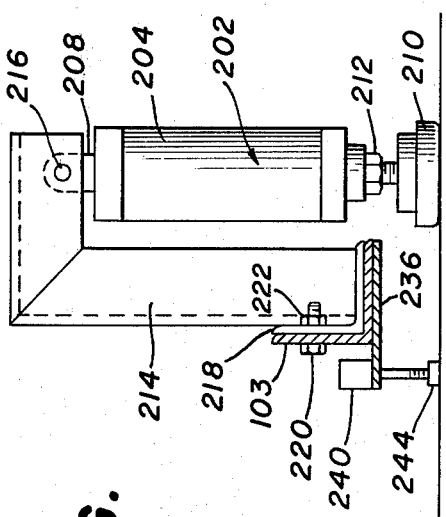

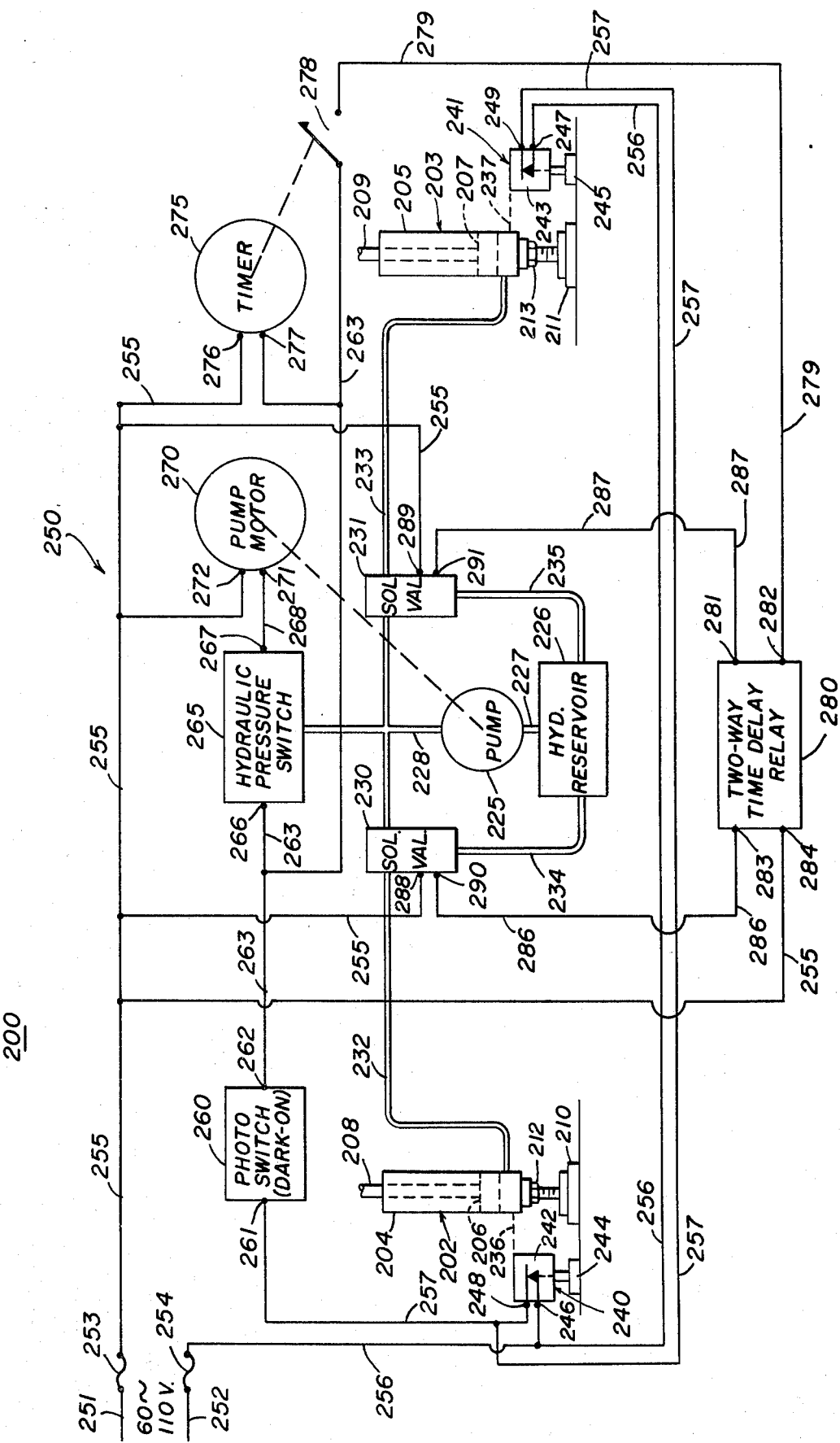

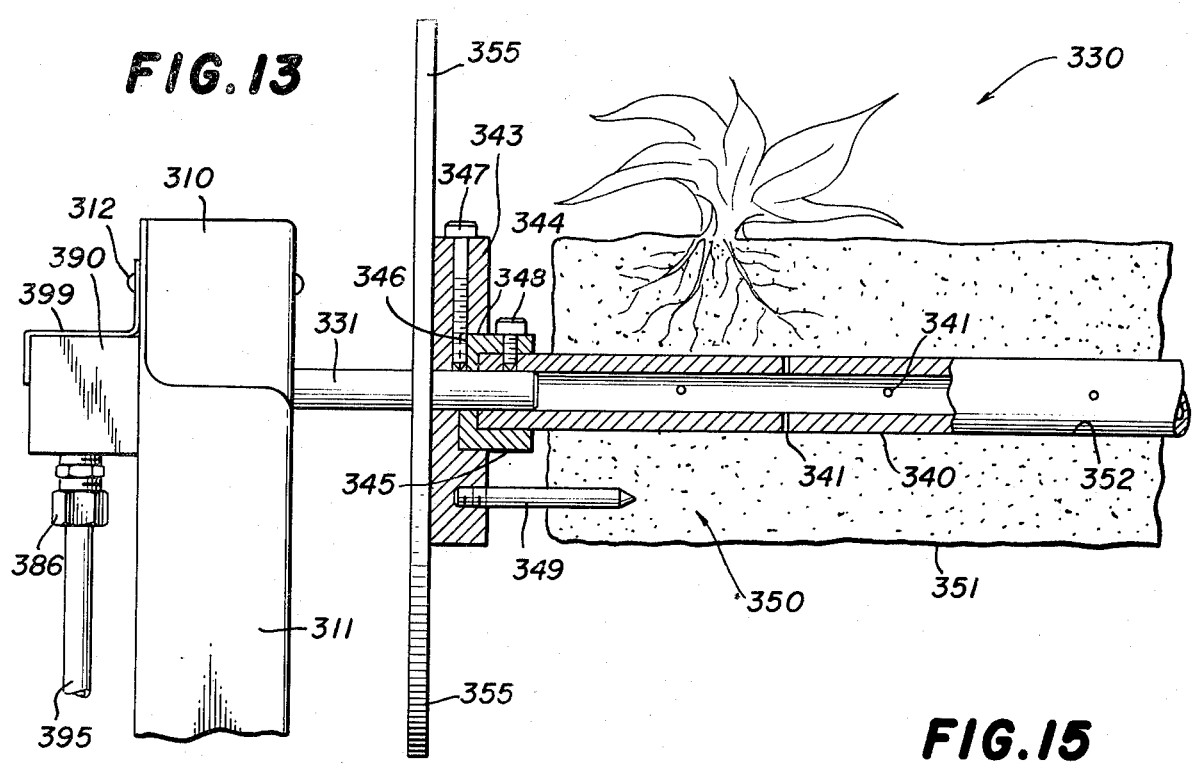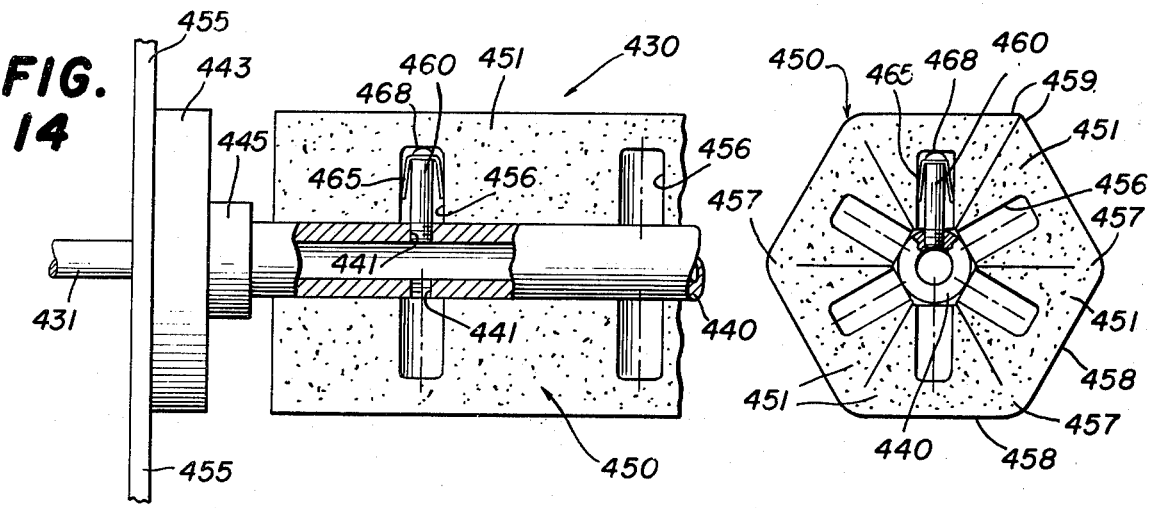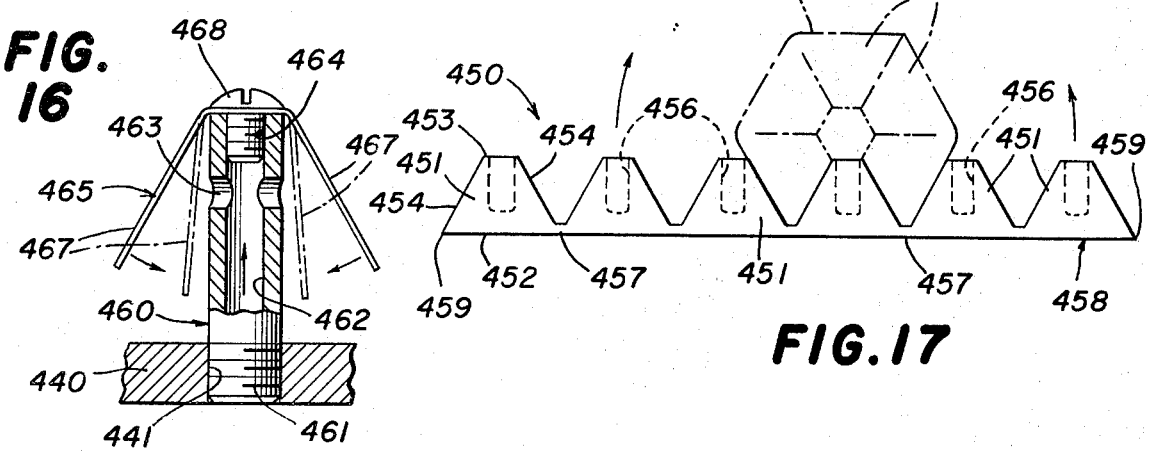

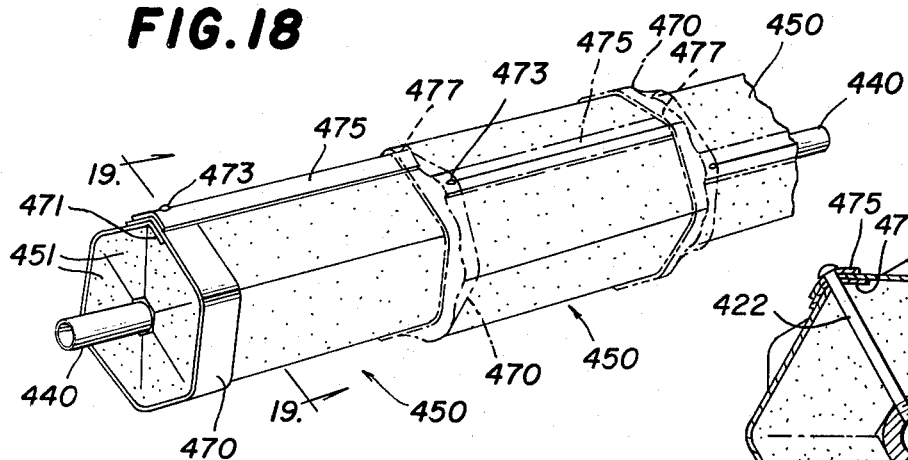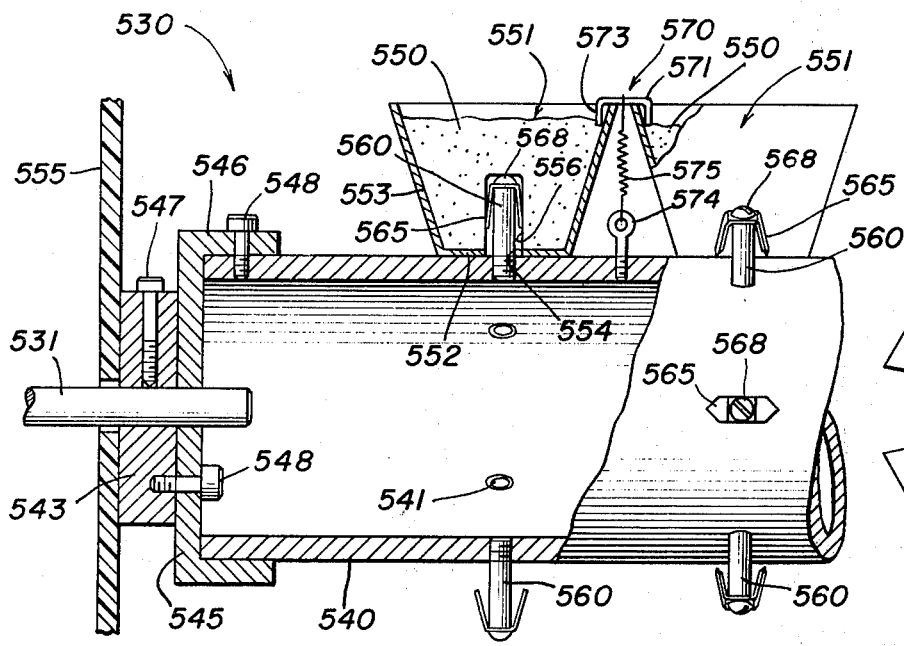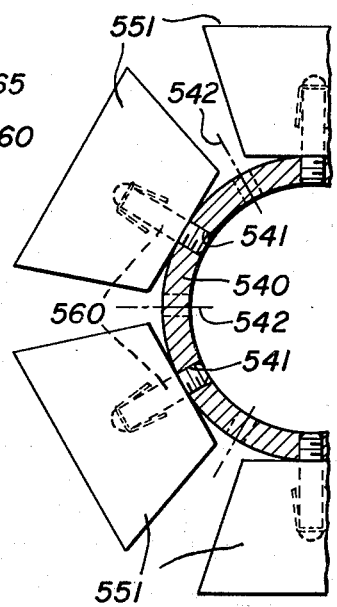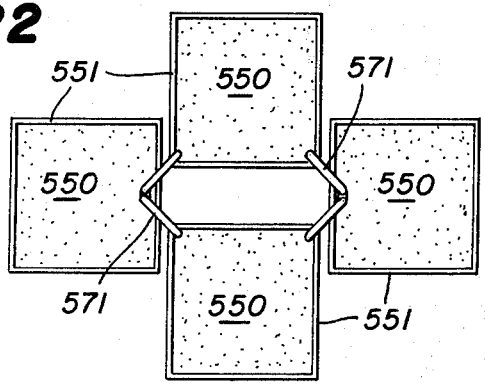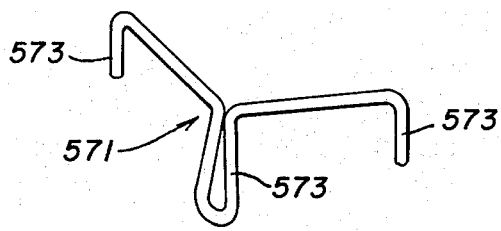

PLANT GROWTH ACCELERATING APPARATUS

BACKGROUND OF THE INVENTION

The present invention relates generally to improvements in plant growth accelerating apparatus and particularly to such apparatus including structure for tilting the axis of the plant bed during turning thereof, improved gravity watering systems for turning plant beds, and improved rooting media for use in such apparatus as well as methods of making such rooting media.

This application is an improvement upon the apparatus disclosed and claimed in the applicant's copending application for U.S. Letters Patent, Ser. No. 428,995 filed Dec. 27, 1973 for ROTARY PLANT GROWTH ACCELERATING APPARATUS, and the disclosure of that prior application is incorporated herein by reference.

The apparatus disclosed in Ser. No. 428,995 is highly effective in increasing plant yields by removing the growing plants from the constraints of gravity. However, it has been found that not only is the rate of formation of carbohydrates by photosynthesis increased by gravity nullification, but the respiration rate is likewise increased when the plants are in the dark or in low intensity light conditions.

Although this effect can be nullified in turn by providing supplemental lighting so that the plants are constantly subjected to light, certain plants will not develop normally under such conditions, those plants requiring alternate periods of light and dark (photoperiodic requirement), examples thereof being strawberries, onions, pansies and poinsettias; other plants such as tomatoes will grow better if subjected to alternating periods of light and dark. In fact the increased rate of respiration in the dark may be so great and the relationship between the light and dark periods such that the fixed carbon accumulation by plants during photosynthesis is completely consumed during respiration by the dark.

Problems have also been encountered in maintaining and manufacturing certain of the rotary seals utilized in apparatus of this type heretofore and improved rooting media also are considered highly desirable.

Reference is also made to the article by R. R. Dedolph et al. entitled "Casual Basis of Gravity Stimulus Nullification by Clinostat Rotation", Plant Physiology, Vol. 42, No. 10, Oct. 1967, pp. 1373–1383.

SUMMARY OF THE INVENTION

The present invention provides a plant growth accelerating apparatus which materially decreases the rate of respiration of plants thereon during the dark, provides a simplified gravity feed for liquids to the plant beds during turning thereof, and provides improved plant bed structures and methods of making the same.

This is accomplished in the present invention, and it is an object of the present invention to accomplish these desired objectives, by providing a plant growth accelerating apparatus comprising a mounting stand for a plant bed mounted thereon for turning about the longitudinal axis of the plant bed, a first drive structure for turning the plant bed about its longitudinal axis, a system for supplying liquids to the plant bed essentially along the longitudinal axis thereof while the plant bed is being turned, the longitudinal axis of the plant bed being normally arranged substantially horizontal while relatively high light intensities are incident on the plant bed, and a second drive structure for periodically tilting the longitudinal axis of the plant bed while relatively low light intensities are incident on the plant bed to impart thereto a slope with respect to the horizontal of from about 0.01 to about 0.25 to decrease the respiration rate of plants growing on the plant bed.

In connection with the foregoing object, another object of the invention is to provide an apparatus of the type set forth wherein the axis of the plant bed is first tilted in one direction and then tilted in the other direction so as to prevent geotropic deformation of the plants.

A further object of the invention is to provide an apparatus of the type set forth wherein a control system is provided for the second drive structure including a light intensity detector so as to activate the second drive structure when the light intensity incident on the plant bed falls to a predetermined level.

Yet another object of the invention is to provide an apparatus wherein the tilting feature is applied to an apparatus having a plurality of plant beds thereon.

Another object of the invention is to provide a plant growth accelerating apparatus having a plurality of plant beds all turning about a primary axis and turning also about individual axes, an annular trough disposed about the primary axis and opening inwardly theretoward to provide in the lower portion thereof a liquid receptacle, a system for supplying liquids to the trough while the plant beds are being turned about the primary axis and the respective individual axes of the plant beds, and a plurality of connections between the annular trough and the plant beds whereby liquids are periodically supplied to each plant bed by gravity when the plant bed is disposed below the level of liquid in the trough.

In connection with the foregoing object, it is another object of the invention to provide a liquid supply system whereby liquid is fed simultaneously to both ends of a plant bed.

Yet another object of the invention is to provide an apparatus of the type set forth wherein the plant bed is a hollow pipe carrying thereon a self-supporting cylinder of rooting media having a longitudinal opening therein receiving the pipe extending thereinto, and fasteners interconnecting the pipe and the cylinder of rooting media.

Another object of the invention is to provide a plant growth apparatus of the type set forth wherein the plant bed includes a hollow pipe having a plurality of tubes extending outwardly therefrom along the length thereof and having openings therein, the tubes receiving a self-supporting section of rooting media surrounding the pipe and having openings therein to receive the tubes, the rooting media being either a plurality of blocks interconnecting or a body of rooting media disposed in a pot.

A further object of the invention is to provide an improved body of rooting media and a method of making the same, the rooting media having an improved composition and consisting of a body of soil like material bound by an open-celled hydrophilic polymer.

Further features of the invention pertain to the particular arrangement of the parts of the plant growth accelerating apparatus and the construction and composition of the beds thereof, whereby the above outlined and additional operating features thereof are attained.

The invention, both as to its organization and the method of operation, together with further features and advantages thereof, will best be understood with reference to the following specification taken in connection with the accompanying drawings.

BRIEF DESCRIPTION OF THE DRAWINGS

FIG. 7 is an enlarged view with certain parts broken away through one of the plant beds illustrated in FIG. 1;

FIG. 8 is an enlarged view of one of the fluid motors forming a part of the tilting system of FIG. 1;

FIG. 9 is a fragmentary view taken at right angles to the view of FIG. 8;

FIG. 10 is an electrical and hydraulic control system for operating the tilting system of the apparatus of FIG. 1;

FIG. 13 is a fragmentary view partly in section of one end of a first modification of a plant bed made in accordance with the present invention and useful in the apparatus such as that illustrated in FIG. 1;

FIG. 14 is a view partly in section of a second modification of a plant bed made in accordance with the present invention;

FIG. 15 is a view in cross section through the plant bed of FIG. 14;

FIG. 16 is an enlarged view partly in section of one of the watering tubes of FIG. 14;

FIG. 17 is an end view of a section of rooting media useful in the plant bed of FIGS. 14–16, the rooting media being shown in the as-molded condition is solid lines and being shown in the folded condition in dashed lines;

FIG. 18 is a partial perspective view illustrating the manner of mounting a plurality of the rooting media sections of FIG. 17 on a single hollow pipe;

FIG. 19 is a view in cross section along the line 19—19 of FIG. 18;

FIG. 20 is an enlarged fragmentary view of one end of a third modification of a plant bed made in accordance with the present invention and carrying pots containing rooting media.

FIG. 21 is a partial sectional view illustrating the angle of staggering of alternate rows of pots in the plant bed of FIG. 20;

FIG. 22 is a diagrammatic view illustrating the staggered relationship of pots in adjacent rows on the plant bed of FIG. 20; and FIG. 23 is an enlarged perspective view of the hook forming a part of the structure for mounting the pots on the plant bed of FIG. 20.

DESCRIPTION OF THE PREFERRED EMBODIMENTS

Figure 1:
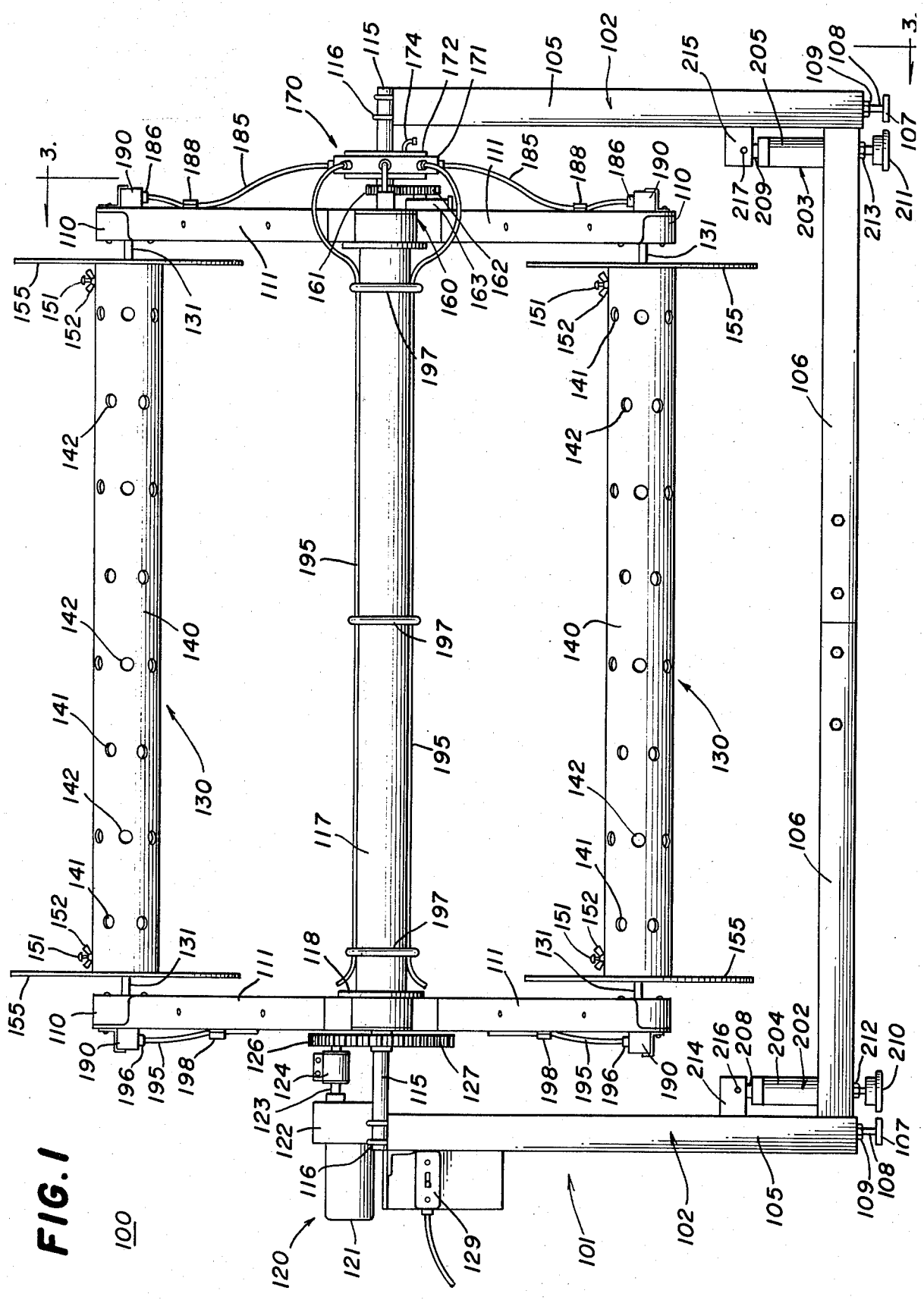
FIG. 1 is a side elevational view of a plant growth accelerating apparatus made in accordance with and embodying the principles of the present invention.

Referring to FIGS. 1 to 10 of the drawings, there is illustrated a first preferred embodiment of a plant growth accelerating apparatus generally designated by the numeral 100 and made in accordance with and embodying the principles of the present invention. As illustrated, the apparatus 100 includes a mounting stand 101 having a pair of end supports 102 that are generally trapezoidal in shape. More specifically, and referring to FIGS. 2 and 3, each of the end supports 102 includes a bottom member 103, a smaller top member 104 and two converging side members 105, all formed of angle iron. Interconnecting the end suports 102 at the lower corners thereof are two longitudinal supports 106, also formed of angle iron, and secured to the end supports 102, such as by welding. The mounting stand 101 is provided with supporting feet 107 in each of the four corners thereof, each of the feet 107 having an integral threaded shank 108 passing through openings in the bottom member 103 and the longitudinal support 106 and being provided with nuts 109 to hold the foot 107 in the adjusted position thereof, the feet 107 serving to level the mounting stand 101 so that the axis of the apparatus 100 is maintained horizontal in the normal position thereof.

Figure 4:
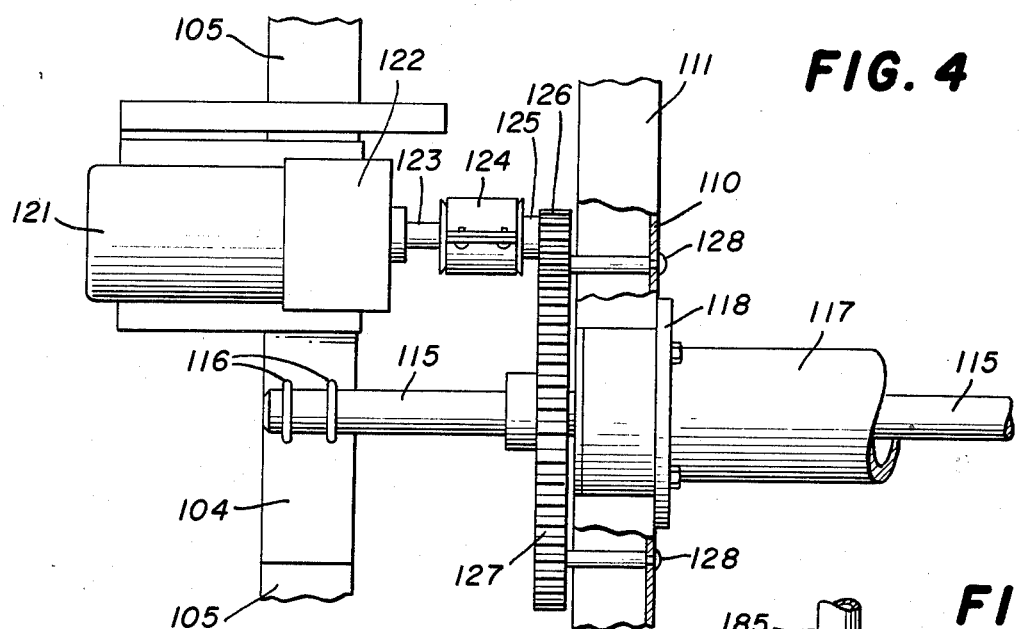
FIG. 4 is an enlarged fragmenatry view of the primary drive structure.
Figure 5:
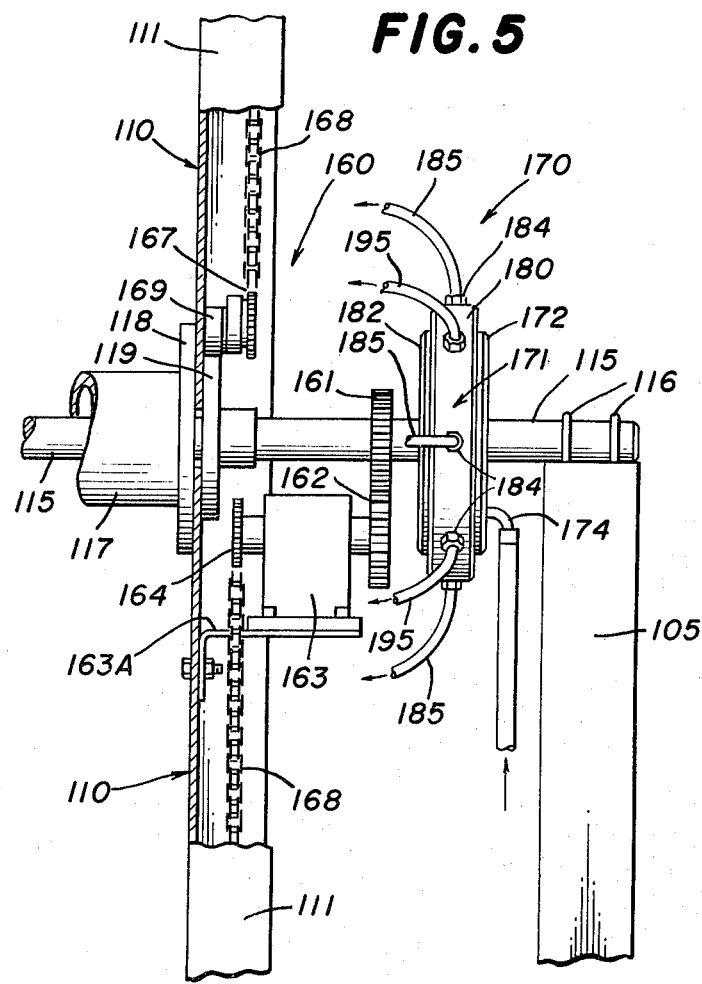
FIG. 5 is a fragmentary view, with certain parts broken away, on an enlarged scale illustrating portions of the liquid supply system of the planetary drive structure.

Mounted upon the stand 101 for turning with respect thereto are two support or end members 110, each support member 110 having four arms thereon, the arms on each support member 110 being equiangularly arranged. The outer ends of the arms of the support members 110 are provided with covers 111 secured in place by screws 112. Referring particularly to FIGS. 4 and 5 of the drawings, it will be seen that the support members 110 have openings therein receiving a shaft 115 therethrough for supporting the same, the shaft 115 as illustrated being solid and fixedly secured to the end supports 102 by pairs of clamps 116. Surrounding the shaft 115 is a pipe 117 having flanges 118 on the outer ends thereof, the flanges 118 being suitably secured as by welding to the support members 110, whereby the support members 110 are mounted on the pipe 117 for turning about the axis thereof and with the arms on one of the support members 110 in angular alignment with the arms on the other support members 110. To facilitate turning of the pipe 117 and the attached support members 110 about the shaft 115, two pillow blocks 119 are provided and secured to the support members 110 to provide bearings for the pipe 117.

During operation of the apparatus 100, it is desired to turn the support members 110 about the axis of the shaft 115, and to this end a primary drive system generally designated by the numeral 120 has been provided (see FIGS. 1 and 4). The drive system 120 includes an electric motor 121 mounted upon one of the end supports 102, the output of the motor 121 driving a gear reducer 122 having an output shaft 123. The output shaft 123 is in turn connected to a slip clutch 124 having a driving shaft 125 carrying a driving gear 126. Meshing with driving gear 126 is a driven gear 127 mounted upon the adjacent end support 110 and secured thereto such as by bolts 128 to turn therewith, the axis of the driven gear 127 being aligned with the axis of the shaft 115 and the pipe 117. When the motor 121 is energized, the drive 120 serves to turn the support members 110 at a uniform rate about the axis of the shaft 115, the slip clutch 124 providing a safety feature in the event that movement of the support members 110 and attached structure is impeded, the slip clutch 124 permitting the support members 110 to be stopped even though the motor 121 continues to operate.

The support members 110 carry four plant beds disposed resepctively adjacent to the outer ends of the arms on the support members 110. Referring specifically to FIGS. 1 and 7 of the drawings, it will be seen that each of the plant beds 130 is supported upon two stub shafts 131 disposed respectively at the outer ends of the plant bed 130, each of the stub shafts being hollow and respectively supported upon the associated support member 110 by a bearing 133 secured to the support member 110 by bolts 137. The inner ends of the shafts 131 carry a conical surface 132, while the other end has a first groove 134 with an opening 135 therein communicating with the longitudinal opening in the shaft 131, and a second groove 136 for receiving an O-ring to be described more fully hereinafter. The plant bed 130 includes also an elongated cylinder 140 disposed between the associated support members 110 and overlapping the inner ends of the stub shafts 131. Two retainer structures are provided respectively in the opposite ends of the cylinder 140 to mount the same upon the stub shafts 131, the retainer structure for ease of construction including three blocks 143, 147 and 149 cemented together, the block 143 having a diameter just to fit within the tube 140 and having an opening 144 therein to receive the conical surface 133, the block 147 also having an outer diameter just to fit within the cylinder 140 and having a smaller opening 148 centrally therein, and the block 149 having a smaller outer diameter and an opening centrally thereof to receive one end of a hollow tube 145 therein. The tube 145 extends between two blocks 147 and is in communication with the openings 148 therein, the tube 145 having a plurality of openings 146 along the length thereof from end to end.

The space 150 between the inner surface of the cylinder 140 and the outer surface of the tube 145 is adapted to receive rooting media, the roots of the growing plants being disposed therein with the plants extending through a series of openings 141 and 142 disposed in the wall of the cylinder 140. As illustrated, several sets of openings 141 are provided along the length of the cylinder 140, each set of the openings 141 having six openings arranged equiangularly around the cylinder 140. Several sets of the openings 142 are all provided along the length of the cylinder 140, each set of the openings 142 containing six openings equiangularly spaced about the cylinder 140. It is pointed out that the sets of openings 141 and 142 alternate and are angularly displaced 30° with respect to each other, whereby to provide greater spacing between growing plants, thus better to utilize the surface of the cylinder 140 for the plant growing purpose. The reatiner structure is held in position in the ends of the cylinder 140 by bolts 151 extending through the cylinder 140, and specifically threaded openings therein, the ends of the bolts 151 respectively engaging the conical surfaces 133. A wing nut 152 is provided to lock the adjusted position of bolt 151 to hold the cylinder 140 in place. Water is to be fed through the hollow shaft 131, and accordingly a washer 153 is provided to seal the end of the shaft 131 with respect to the block 147 so as to provide a fluid-tight juncture therebetween, the bolts 151 pressing the ends of the shafts 131 against the washers 153 to effect the necessary seal. There also is provided on the end of the cylinder 140 a plant shield 155 so as to prevent plants from growing toward and into the support members 110 and into the various mechanisms carried thereby. It will be appreciated that the retainer block and bolt structure illustrated facilitates the disassembly of the cylinder 140 from the support members 110 for servicing and replacement of the rooting media in the space 150.

Figure 3:
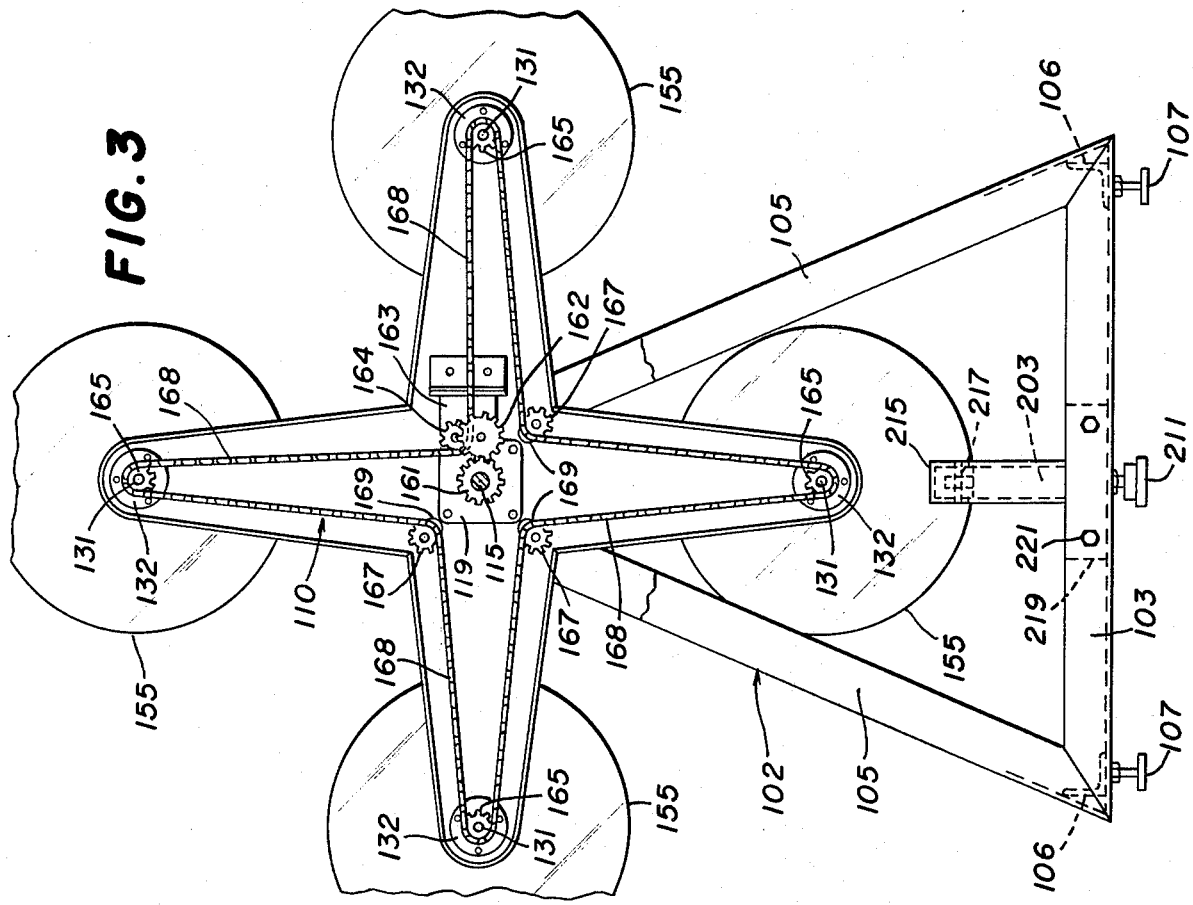
FIG. 3 is a view in vertical section along the line of FIG. 1.

Referring next to FIGS. 3, 5 and 7, there is illustrated a planetary drive system 160 for turning each of the plant beds 130 about the longitudinal axis thereof. The drive system 160 includes a sun gear 161 fixedly mounted upon the stationary shaft 115 at the right hand end thereof as viewed in FIGS. 1 and 5. Meshing with the sun gear 161 is a gear 162 which drives through the gear reduction box 163 (mounted by a bracket 163A on the adjacent support member 110), a driving sprocket 164. Referring also to FIG. 7, it will be seen that each of the stub shafts 131 disposed to the right carries a driven sprocket 165 that is free to rotate with respect to the shaft 131 but is drivingly connected thereto through the detent clutch 166. There also is provided on the adjacent support member 110 three idler sprockets 167 mounted on adjusting members 169. The driving sprocket 164, the driven sprockets 165 and the idler sprockets 167 are interconnected by a driving chain 168. As the primary drive system 120 turns the support members 110 about the axis of the shaft 115, the planetary drive system 160 will turn the plant beds 130 aboiut the longitudinal axes thereof. If the primary driving system is operating to turn the support members 110 in the clockwise direction, then each of the plant beds 130 is rotated in a counterclockwise direction about its own axis.

Figure 6:
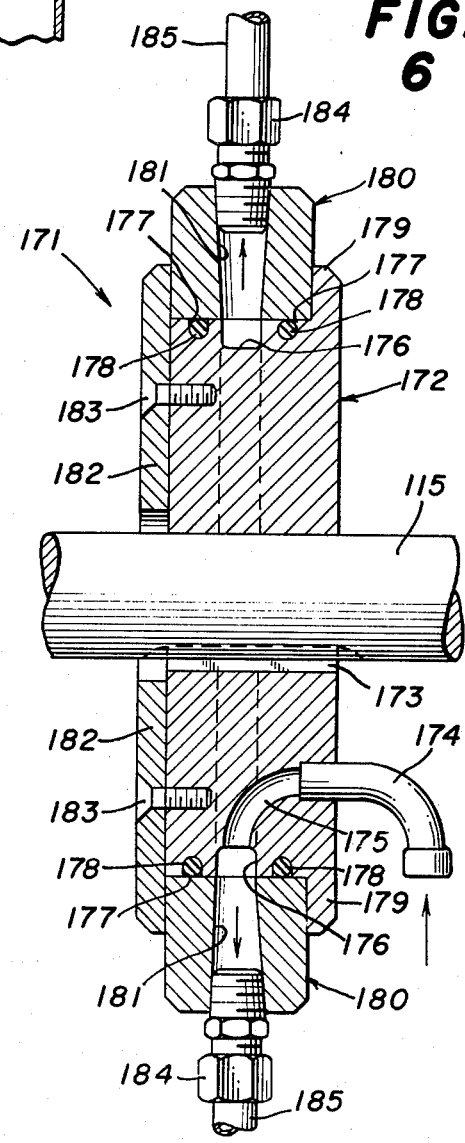
FIG. 6 is a further enlarged view in vertical section through the supply manifold of the liquid supply system.

There is provided for apparatus 100 a liquid supply system connected to each of the plant beds 130, the liquid supply system providing water and water solutions of nutrients to the plant beds 130 and the plants growing thereon. Referring particularly to FIGS. 1, 5 and 6, there is provided a manifold 171 including a stationary member 172 mounted upon the right hand end of the fixed shaft 115 and secured thereto as by a key 173 positioned in cooperating slots. An inlet connection 174 is provided to the member 172 and communicates with a passage 175 that in turn communicates with an annular groove 176 extending around the outer periphery of the stationary member 172. Disposed on each side of the annular groove 176 is an O-ring groove 177 containing an O-ring that cooperates with the inner surface of an annular member 180 that rotates about the stationary member 172. It will be seen that the inner surface of the rotating member 180 is in communication with the annular groove 176, and the rotating member 180 has eight openings therein extending radially therethrough and equiangularly spaced therearound. As illustrated, the rotating member 180 bears against a flange 179 on the member 172 and is held thereaginst by a retaining member 182 secured to the stationary member 172 by a plurality of screws 183. Each of the radial openings 181 is provided with a coupling 184. Alternate ones of the couplings 184 are connected to a first set of hoses 185, the hoses 185 extending upwardly to the adjacent end of the plant beds 130 (see FIGS. 1 and 7).

There is provided on each end of the plant beds 130, and specifically on each end of the hollow stub shafts 131 and associated therewith a rotating seal 190 (see FIG. 7). Each seal 190 includes a substantially rectangular block 191 having a longitudinally arranged opening 192 receiving the adjacent end of the associated stub shaft 131. There also is provided a passageway 193 communicating with the opening 192. In the case of a hose 185, a coupling 186 is threadedly connected to the passageway 193 so as to connect the hose 185 to the passageway 193 and the opening 192, brackets 188 securing the hoses 185 to the adjacent support member 110. An O-ring 194 is disposed in the groove 136 in the shaft 131 to provide a seal for the opening 192. By this connection, water can be conveyed under pressure through the manifold 171, the hoses 185 and the rotating seals 190 to the adjacent ends of the stub shaft 131 and thence to the adjacent ends of the plant beds 130. A clip 199 preventing displacement of the rotating seal 190 is attached to the member 110 by the screw 112.

Figure 2:
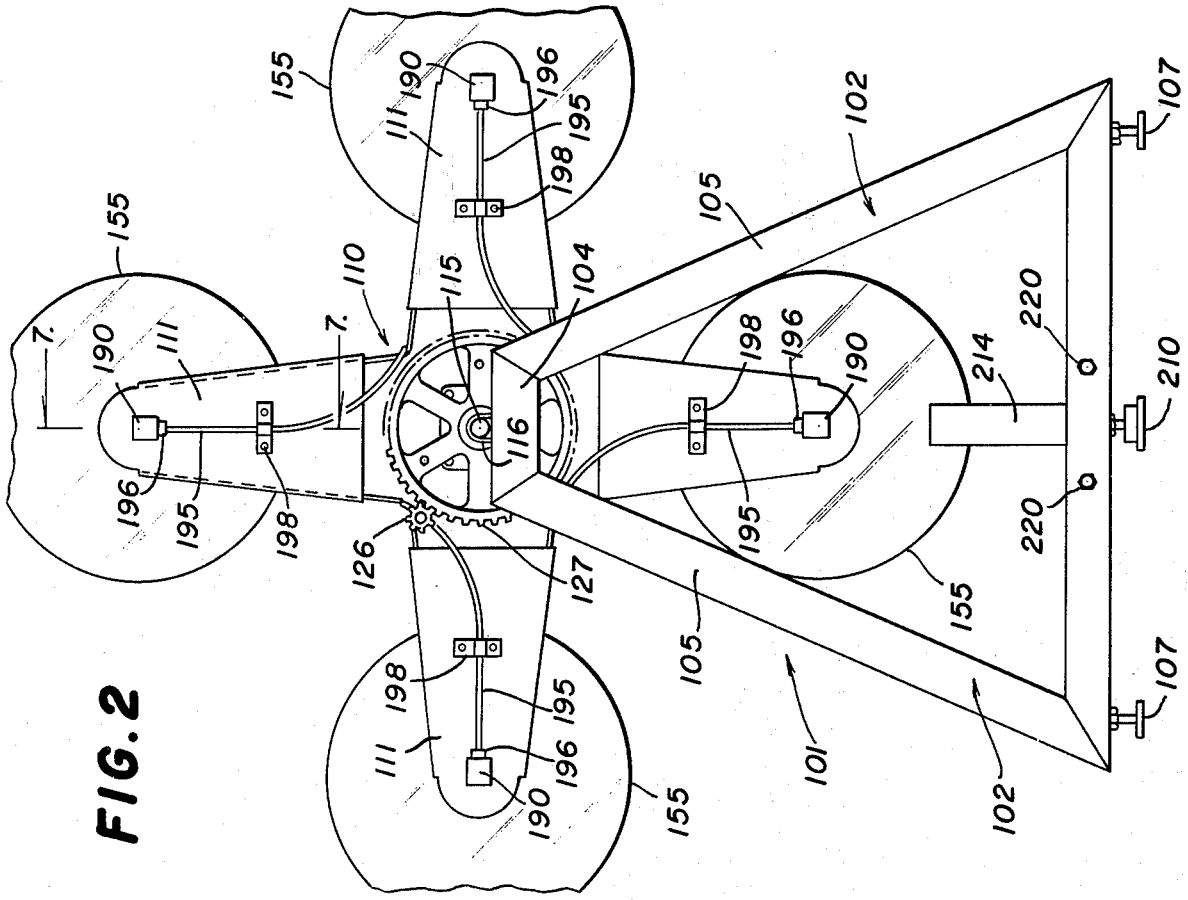
FIG. 2 is an end elevational view, with the primary drive structure broken away, of the left hand end of FIG. 1.

The remaining four couplings 184 on the rotating member 180 are connected to a second set of hoses 195, four of the hoses 195 being provided and extending along the pipe 171 and secured thereto by clamps 197 and thence to the left hand end of the apparatus 100 for connection by couplings 196 to the rotating seals 190 on the adjacent ends of the stub shafts 131. Brackets 198 secure the hoses 195 to the associated arm of the support member 110 as illustrated in FIG. 2.

The watering system 170 thus illustrated can be connected to a source of water or nutrient solutions under pressure through the inlet connections 174, and the solution is then distributed by the manifold 171 to the two sets of hoses 185 and 195, respectively, all while the support members 110 are being rotated by the primary drive system 120. The hoses 185 and 195 respectively conduct the watering solution to the opposite ends of the plant beds 130 through the rotating seals 190 and the hollow stub shafts 131, thus to provide watering solution simultaneously to both ends of the plant beds 130, all while the plant beds 130 are being rotated about the axes thereof by the planetary drive system 160. It will be appreciated that the source of watering solution will be periodically interrupted to permit the plant beds to dry and cause aeration thereof to facilitate and accelerate the growth of plants thereon.

Referring now to FIGS. 1, 2, 3, 8, 9 and 10 of the drawings, a tilting system 200 will be described which serves to tilt first one end of the mounting stand 101 upwardly, and then the other end of the mounting stand 101 upwardly. The system 200 includes two fluid motors 202 and 203 disposed at the opposite ends of the mounting stand 110, the fluid motors including cylinders 204 and 205, respectively, having pistons 206 and 207 with attached piston rods 208 and 209, respectively. The bottoms of the cylinders carry feet 210 and 211, respectively, which are threadedly mounted thereon and adjustable with respect thereto, including nuts 212 and 213, respectively, provided to lock the feet 210 and 211 in the adjusted position. The cylinders 204 and 205 are attached to the bottom members 103 adjacent to the midpoints thereof and inboard therof by L-shaped brackets 214 and 215, respectively. The brackets 214 and 215 are formed as channels in cross section, one end thereof being connected by pins 216 and 217, respectively, to the upper ends of the piston rods 208 and 209, and the other ends of the brackets 214 and 215 having secured thereto as by welding support angle iron sections 218 and 219, respectively, that are bolted by bolts 220 and 221, respectively, and nuts 222 and 223, respectively, to the adjacent bottom member 103.

Referring to FIG. 10, there is shown the hydraulic and electrical circuit for controlling the operation of the tilting system 200. As illustrated, a hydraulic pump 225 having the usual reservoir 226 with an interconnecting conduit 227 is provided. The output from the pump 225 is into a conduit 228 to which are connected a solenoid valve 230 for controlling the fluid motor 202, a solenoid valve 231 for controlling the fluid motor 203 and a hydraulic pressure switch 265 to be described more fully hereinafter. The solenoid valve 230 is connected to the cylinder 204 of the fluid motor 202 through a conduit 232, and the solenoid valve 231 is connected to the cylinder 205 of the fluid motor 203 through the conduit 233. There also is associated with the fluid motors 202 and 203 switches 240 and 241, respectively, that are provided with pairs of contacts 242 and 243, respectively, the switches 240 and 241 being mounted upon plates 236 and 237 carried by the adjacent bottom member 103. Actuation of the switches 240 and 241 is by adjustable feet 244 and 245, respectively, which are mechanically connected so as to move the switch contacts 242 and 243, respectively, to the closed positions when the associated feet 244 and 245 are on the underlying support surface. The switch contacts 242 are provided with terminals 246 and 248, while the switch contacts 243 are provided with terminals 247 and 249.

The various parts illustrated in FIG. 10 form the control system 250 which automatically tilts the apparatus 100 when the incident light intensity falls to a predetermined level, all as will be described more fully hereinafter. The control system 250 includes a pair of electric line conductors 251 and 252 connected through lines fuses 253 and 254, respectively, to conductors 255 and 256, respectively. The line conductors 251 and 252 are adpated to be connected to a source of operating potential, the preferred source being a 60 cycle 110 volt source. The conductor 256 is connected to the terminal 246 of the switch 240 and the terminal 247 of the switch 241, while the terminals 248 and 249 are connected to a conductor 257. The conductor 257 also is connected to a photo switch 260 which is of the type which becomes conductive in the dark, the photo switch 260 having two terminals 261 and 262 respectively connected to the conductors 257 and 263. The conductor 263 is also connected to a hydraulic pressure switch 265 which is of the type that is closed when the pressure in conduiit 228 is low and is open when the pressure in the conduit 228 reaches a predetermined value, the switch 265 having terminals 266 and 267 connected respectively to the conductors 263 and 268. The connector 267 is also connected to a pump motor 270 that is mechanically connected to drive the pump 225, and is provided with two electrical terminals 271 and 272 respectively connected to the conductors 268 and 255. Also connected between the conductors 255 and 263 is an electrical timer 275 having terminals 276 and 277, respectively, connected to the conductors 255 and 263, the timer 275 controlling a normally open switch 278 having terminals connected respectively to conductors 263 and 279.

There also is provided a two-way time delay relay 280 having four terminals 281, 282, 283 and 284. The relay 280 is designed to control the operation of solenoid valves 230 and 231, the solenoid valve 230 being electrically operated and having terminals 288 and 290 respectively connected to conductors 255 and 286, while the solenoid valve 231 has terminals 289 and 291 respectively connected to the conductors 255 and 287. The relay 280 has terminals thereof connected as follows: terminal 281 to the conductor 287, terminal 282 to the conductor 279, terminal 283 to the conductor 286 and the terminal 284 to the conductor 263.

In use, the control circuit 250 serves when the light intensity falling upon the beds 130 is low (or in the dark) alternately to actuate first the fluid motor 202 and then after a suitable time delay, the motor 203, so as to tilt the axes of the plant beds 130 first in one direction, and then in the other direction. Assuming that the apparatus 100 has been exposed to sunlight, the photo switch 260 is open, whereby to deenergize the circuit 250; both of the fluid motors 202 and 203 are in the retracted positons thereof, whereby the feet 107 of the mounting stand 101 are all disposed upon the underlying support surface. The feet 244 and 245 of the switches 240 and 241 are also in contact with the underlying support surface so as to close the switch contacts 242 and 243.

Assuming now that the line potential is applied to conductors 251 and 252, when the apparatus 100 is next exposed to a period of darkness, the low light intensity will be sensed by the photo switch 260 and the switch 260 closes to complete a circuit between the conductors 257 and 263. Since there will be a low pressure in the conduit 228, the hydraulic pressure switch 265 will also be closed whereby closure of the photo switch 260 energizes the pump motor 270 and starts the timer 275. The pump 225 will generate hydraulic pressure in the output conduit 228 and supply the fluid under pressure to the solenoid valves 230 and 231.

Shortly thereafter the timer 275 operates to close the switch 278 and thus to complete a circuit for the relay 280. The realy 280 operates to actuate the solenoid valve 230, for example, thus to feed hydraulic fluid under pressure to the motor 202, thus raising the adjacent end of the mounting stand 101. After a suitable interval, for example, two hours, the relay 280 controlled by the timer 275 operates the solenoid valve 230 to close the connection to the conduit 228 and to open a connection from conduit 232 to the conduit 234, thus to cause the hydraulic motor 202 to be retracted. After a suitable time delay to insure that the motor 202 is fully retracted, the relay 280 operates to energize the solenoid valve 231 to admit hydraulic fluid under pressure into the conduit 233 to actuate the fluid motor 203. It will be appreciated that if the contacts 242 are in the open position, then the circuit is interrupted as soon as the switch contacts 243 are opened since there will be no power fed from the main line conductor 251 through the conductors 256, 257, 263 and 268 to the pump motor 270. This serves to insure that only one of the fluid motors 202 or 203 is actuated at one time.

After a suitable time interval, such for example as two hours, the operation of the relay 280 is reversed.

It has been found that tilting the axes of the plant beds 130 materially decreases respiration in the dark, the decrease in respiration rate being in the order of 10 to 15 percent. Moreover, it has been found that the respiration rate begins to decrease when the slope of the axes of the plant beds 130 is as small as 0.01, and that for many plants when the slope of the axes reaches 0.1, the respiration rate is the same as that in a gravity field of 1G. However, in certain instances it may be desirable to increase the slope even above 0.1 and up to as much as 0.25. By so tilting the axes of plant beds 130, the respiration rate is materially decreased i.e., by as much as 10 to 15 percent, thus to conserve fixed carbon during the dark period and thus increasing the net fixation of carbon. Tilting the axes of the plant beds 130 first in one direction and then in the other serves to prevent geotropic deformation of the plants growing on the plant beds. Substantially any desired period of tilting in each direction may be utilized, but it has been found that an interval of about 2 hours is practicable and desirable.

By utilizing the switches 240 and 241, it is possible to provide the necessary tilting arrangement using a single hydraulic motor 202 or 203 at each end of the mounting stand 101. More specifically, the mounting stand 101 during tilting is supported on a 3 point base, namely, for example, the foot 210 and the two feet 107 to the right in FIG. 1, or alternatively, by the foot 211 and the two feet 107 to the left in FIG. 1. However, it would not be desirable to have both of the fluid motors 202 and 203 actuated simultaneously since this would result in an unstable 2 point support; such a condition is prevented by the provision of the safety switches 240 and 241 referred to above. "Walking" of the apparatus 100 is prevented by placing the hydraulic motors 202 and 203 and the associated feet 210 and 211 inboard with respect to the adjacent feet 107.

By the provision of the tilting system 200, the growth acceleration features of the apparatus 100 are preserved even when alternate periods of light and dark are necessary either for economic reasons or because of the type of plant being grown upon the plant beds 130.

It further has been found that it is possible to turn the plant beds 130 about the primary and planetary axes at lesser rates than those set forth in my prior application, Ser. No. 428,995. In the apparatus 100 of the present invention, the support members 110 are turned at a rate of one-half revolution per minute, while the individual plant beds 130 turn about their respective axes at a rate of 1 revolution per 50 minutes. Such rates of turning cause a displacement of a starch particle in the cell of a growing plant through an area of about 40 square microns over a 30 day growth interval due to the residual action of gravity not nullified by operation of the apparatus 100. Such displacement does not materially reduce the growth rate of plants as compared to that disclosed in my aforesaid application, Ser. No. 428,995, while materially reducing the possibility of wind damage to plants growing on the plant beds 130 and also while materially reducing flexing of the plants growing thereon. It has now been found that the rate of turning about the primary axis may be in the range from 1 revolution per 5 minutes to 2 revolutions per minute, while the rate of turning of each plant bed 130 about its axis may be in the range from 1 revolution per 200 minutes to 1 revolution per 10 minutes, all while providing material and advantageous growth acceleration for the plants growing on the plant beds 130.

Figure 11:
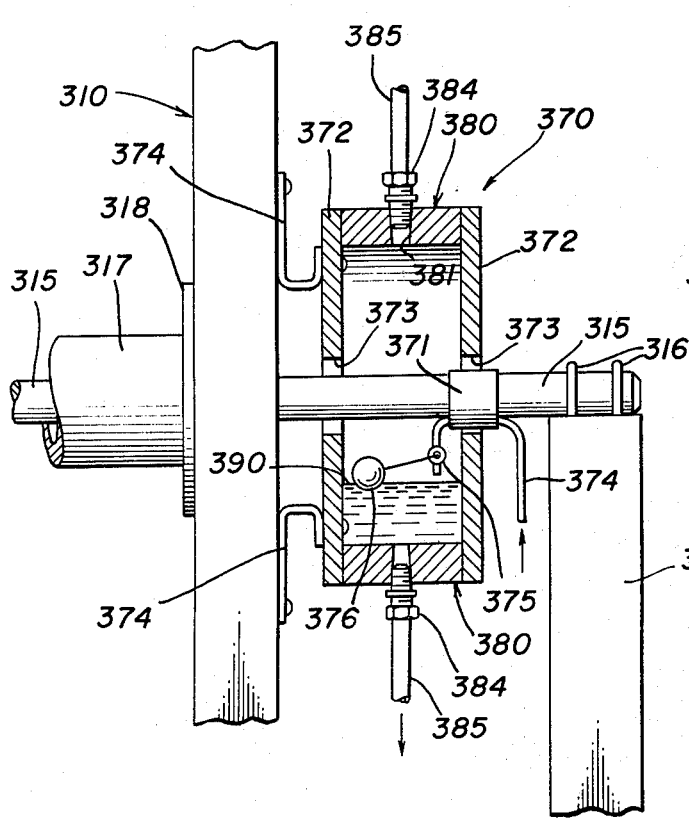
FIGS. 11 and 12 illustrate a modified liquid supply system for an apparatus such as that of FIG. 1.
Figure 12:
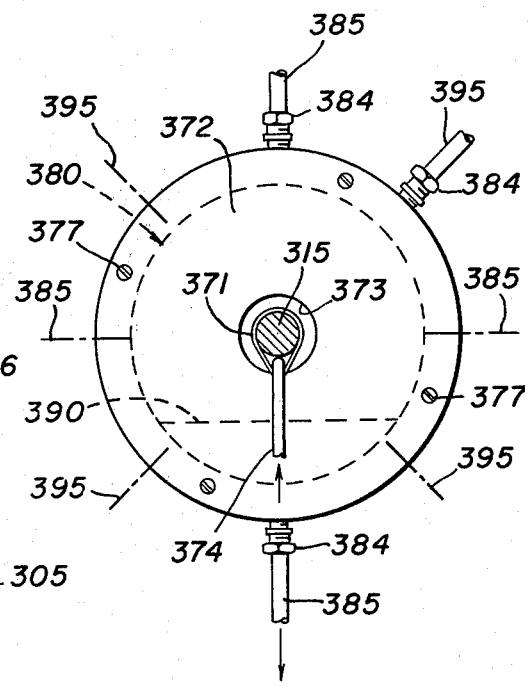

Referring now to FIGS. 11 and 12 of the drawings there is illustrated a modified form of liquid supply system 370, wherein the liquid is supplied under gravity, rather than under high pressure. Many of the parts illustrated in FIGS. 11 and 12 of the drawings have the same construction and function as like parts in FIGS. 1 to 10 of the drawings, and therefore like reference numerals in the 300 series have been applied to the parts in FIGS. 11 and 12 that correspond to like numbered parts in the 100 series in FIGS. 1 to 10.

As illustrated, the watering system 370 includes a trough 380 generally annular in shape and having side walls 372 extending inwardly toward the shaft 315 and having relatively small openings 373 therein receiving the shaft 315 therethrough. The side wall 372 adjacent to the support member 310 is secured thereto by brackets 374 so as to mount the trough 380 for rotation therewith. Water is admitted into the trough 380 from an inlet connection 374 through a control valve 375 under the control of a float 376. The float 376 engages a body of water within the trough 380, the level thereof being indicated as at 390, and the operates to keep the level 390 below the openings 373. The annular wall of the trough 380 has 8 openings 381 equiangularly disposed therearound and provided with couplings 384. Alternate ones of the couplings 384 are connected to a first set of hoses 385 that connect to the adjacent ends of the associated plant beds, while the other couplings 384 are connected to a second set of hoses 395 that connect to the remotely disposed ends of the associated plant beds. Further, the couplings 384 associated with a particular plant bed are in general annular alignment therewith, so that when the axis of the plant bed passes below the level 390 in the trough 380, water is fed by gravity through the associated hoses 385 and 395 simultaneously to the opposite ends of the associated plant bed. In this manner, each of the plant beds is sequentially watered by gravity, there being no necessity for rotating liquid-tight seals in the structure illustrated in FIGS. 11 and 12. Again it will be appreciated that watering will be interrupted periodically to permit the bed to dry and to aerate.

In FIG. 13 there is illustrated a first modification of a plant bed 330 useful in the present invention in place of hte plant bed 130 described heretofore. Many of the parts illustrated in FIG. 13 of the drawings have the same construction and function as like parts in FIGS. 1 to 10 of the drawings, and therefore like reference numerals in the 300 series have been applied to the parts in FIG. 13 that correspond to like numbered parts in the 100 series in FIGS. 1 to 10. In FIG. 13 the stub shafts 331 carry thereon a pipe 340 having openings 341 thereon. A retainer block 343 (formed of plastic) is provided with an opening therein through which extends the associated stub shaft 331 and a recess 344 that receives a cap 345 (also formed of plastic), the cap 345 receiving the adjacent end of the pipe 340 therein. A first set screw 347 extends radially through the block 343 and into a recess 346 in the end of the cap 345 and engages against the adjacent stub shaft 331 to secure the parts thereto. A second set screw 348 passes through the flange of the cap 345 and through an opening in the pipe 340 and also engages against the stub shaft 331. Disposed about the pipe 340 is a body of rooting media 350 that is cylindrical in shape as illustrated and has a cylindrical outer surface 351. An opening 352 extends longitudinally through the rooting media 350 and receives the pipe 340. A plurality of spikes 349 extending longitudinally from the retainer block 343 engaging into the adjacent end of the rooting media 350 to cause the rooting media 350 to rotate with the pipe 341 and associated parts. There also is provided the usual plant shield 355 secured as by cement to the retainer block 343.

The rooting media 350 is unitary in structure and self-supporting and cohesive and in accordance with the present invention is formed of a body of soil-like material bound by an open-celled hydrophilic polymer of synthetic organic plastic resin. The soil-like material may be in fact a true soil, for example, mucks, peats, clays, sands, silts or silt loams. Alternatively, the soil-like material may be a modified mineral such as pearlite, ground pumice or expanded mica. Also useful as the soil-like material are coarsely ground organic material such as straw, sawdust, pecan hulls, rice hulls, peanut hulls, leaf mulch and the like. Other useful soil-like materials are decomposed organic material such as human or animal manures, leaves or garbage. Also useful are short fibers either natural or synthetic such as cotton, nylon, orlon or dacron.

The polymer must be open-celled and hydrophilic to be useful to form the rooting media 350. One preferred such material is a polyurethane polymer sold by the 3M Company under the trade designation XB-2382. Also useful are cellulose resins.

In preparing the rooting media 350, a suitable mold is provided and an acetone solution of licithin is applied thereto and the acetone evaporated so as to leave release layer of lecithin on the surface of the mold. A slurry of the soil-like material in water with the polymer added in then formed. An example of a suitable such slurry would be 100 grams of the soil-like material, 8 grams of the polyurethane resin (XB-2382) and 20 grams of water. The slurry is then poured into the mold and the resin allowed to react. Some of the water is taken up in the chemical reaction of the polymer and the rest is evaporated. Once the polymer is set up, the rooting media can be removed from the mold.

In general the ratio between the soil-like material and the resin should be in the range of about 7 to 20 parts by weight of the resin to 100 parts by weight of the soil-like material. The quantity of water used is not critical since any excess water simply drains away or evaporates, whereby an excess of water should be used to insure full reaction of the polymer.

After the rooting media has been formed, it is boiled in water for approximately 10 minutes. Such boiling tends to loosen the structure and improve the ability of the material to receive the roots therethrough. Boiling also serves to sterilize the rooting media so as to prevent infection of plants grown thereon. The boiling further improves the water handling characteristics of the rooting media, the rooting media draining better, for example, after boiling. Finally, boiling improves the handling characteristics of rooting media for example, making cutting and shaping thereof easier and cleaner.

In a constructional example of the plant bed 330, the pipe 340 has an external diameter of 1 inch and is preferably formed of stainless steel, while the block 343 and the cap 345 are formed of polyvinyl chloride resin. The rooting media 350 has an outer diameter of approximately 4 inches and the opening 352 extending therethrough has a diameter of approximately 1 inch to receive the pipe 340 therein. The openings 341 in the pipe 340 are spaced longitudinally 3 inches so as to provide watering of the rooting media 350 from the inner surface thereof outwardly. The rooting media 350 is made like the rooting media 150 described above and may be of a single piece and have a longitudinal extent of 12 feet; alternatively, the rooting media 350 may be made up of several longitudinal sections, the adjacent ends of the sections of the rooting media 350 being suitably joined to insure rotation thereof with the pipe 340.

Referring to FIGS. 14 through 19 there is illustrated a second modification of a plant bed 430 useful in the present invention in place of the plant beds 130 and 330 described heretofore. Many of the parts illustrated in FIGS. 14 to 19 of the drawings have the same construction and function as like parts in FIGS. 1 to 10 of the drawings and as like parts in FIG. 13 of the drawings, and therefore like reference numerals in the 400 series have been applied to the parts in FIGS. 14 to 19 that correspond to like numbered parts in the 100 series in FIGS. 1 to 10 and to like numbered parts in the 300 series in FIG. 13.

Referring first to FIGS. 14 to 16, the stub shaft 431 carry thereon a pipe 440 having threaded openings 441 therein along the length thereof. A retainer block 443 is provided with an opening therein through which extends the associated stub shaft 431 and a recess that receives a cap 445, the cap 445 receiving the adjacent end of the pipe 440 therein. Set screws (not shown) interconnect the stub shaft 431, the block 443, the cap 445 and the pipe 440. Disposed in the threaded openings 441 of the pipe 440 are watering tubes 460, each of the tubes 460 being formed of a suitable synthetic organic plastic resin, such as nylon, and having a threaded outer end 461 threadedly received in one of the openings 441 so as to mount the tube 460 in a position extending radially outwardly from the pipe 440. A longitudinal opening 462 is provided in the tube 460 as is a pair of transverse openings 463, whereby water can be fed from the opening in the stub shaft 431 into the pipe 440 and then through the openings 462 and 463 in the tube 460. In order to insure that the openings 463 remain clear for passage of water therethrough upon the insertion of the tube 460 into a body of rooting media, a protective shield 465 is provided thereon. The shield 465 is formed of plastic and has two pointed ends 467 which can be readily flexed between the solid line positions and the dashed line positions in FIG. 16, the shield 465 being held in position on the tube 460 by a screw 468 threadedly engaging the outer end of the tube 460 as at 464.

Disposed about the pipe 440 and impaled upon the tubes 460 is a rooting media generally designated by the numeral 450. Referring to FIGS. 15 and 17, it will be seen that the rooting media 450 is formed as a single cohesive body including a plurality of blocks 451 connected by hinge portions 457. Each of the blocks 451 extends the entire axial length of the rooting media 450 when applied to the pipe 440 and is generally trapezoidal in shape as viewed from the ends in FIG. 17. More specifically, each of the blocks 451 includes a longer base 452 and a shorter top 453 interconnected by sloping sides 454. Six of the blocks 451 have been illustrated interconnected by five of the hinge portions 457, whereby the rooting media 450 can be folded to provide a piece having a hexagonal outer periphery 458 with a hexagonal opening extending therethrough. Disposed in each of the blocks 451 are two laterally spaced-apart holes 456 which receive respectively one of the watering tubes 460.

Although the watering tubes 460 may provide sufficient frictional retention force to hold the rooting media 450 in place upon the pipe 440, this frictional force may not be adequate, particularly when the plant growth upon the rooting media 450 is heavy. Accordingly, auxiliary fastening structure is provided as illustrated in FIGS. 18 and 19 of the drawings. As illustrated, a plurality of first straps 470 are provided extending circumferentially around the ends of the sections of rooting media 450, the adjacent ends of adjacent sections of rooting media 450 being covered by a single strap 470. The ends 471 of the straps 470 are overlapped and receive therethrough a bolt 472 that extends radially between the end edges 459 of the rooting media 450 and engages in the threaded opening in the pipe 440. In order to cover the meeting edges 459 of each section of rooting media 450, a second strap 475 is provided with one end receiving the bolt 473 therethrough and the other free end 477 extending beneath the next adjacent strap 470. The straps 475 serve to retard evaporation of water from the free ends and outer edges 459, thus to conserve water in the system.

As is best illustrated in FIG. 18, alternate sections of the rooting media 450 are angularly displaced about the tube 440. More specifically, adjacent sections of the rooting media 450 are angularly displaced one half of the angular extent of one of the rhomboidal blocks 451, that being 30° as illustrated in the drawings.

In a constructional example of the plant bed 430, the pipe 440 has an external diameter of 1 inch and is formed of stainless steel, the diameter of the openings 471 and of the tubes 460 is 5/16 inch, and the length that the tubes 460 extends beyond the surface of the pipe 440 is approximately 1 inch. The plant shields 465 are formed of polyethylene resin and have a thickness of 1/16 inch and a width of 5/16 inch and a length from tip to tip of 1¾ inch. The rooting media 450 has an extent along the pipe 440 of 5½ inches, a total circumferential extent of the outer surface 458 of 14 inches, a height of each of the blocks 451 between the case 452 and the top 453 of 1½ inches, and a length of the top 453 of ½ inch, two of the holes 456 being provided in each of the blocks 451. The material of construction of the rooting media 450 is the same as that of the rooting media 150 and 350 described above.

In FIGS. 20 to 23 of the drawings there is illustrated a third modification of a plant bed 530 useful in the present invention in place of the plant beds 130, 330 and 430 described hereinabove. Many of the parts illustrated in FIGS. 20 to 23 of the drawings have the same construction and function as like parts in FIGS. 1 to 10, FIG. 13 and FIGS. 14 to 19, and therefore like reference numerals in the 500 series have been applied to the parts in FIGS. 20 to 23 that correspond to like numbered parts in the 100 series in FIGS. 1 to 10, that correspond to like numbered parts in the 300 series in FIGS. 13, and that correspond to like numbered parts in the 400 series in FIGS. 14 to 19.

In FIG. 20, the stub shafts 531 carry thereon a pipe 540 having series of openings 541 and 542 therein, the openings 541 being equiangularly arranged around the circumference of the pipe 540 and the openings 542 also being equiangularly arranged about the circumference of the pipe 540 and equal in number to the openings 541 and being angularly displaced with respect thereto half of the angular distance between adjacent openings 541. A retainer block 543 is provided with an opening therein through which extends the associated stub shaft 531, a set screw 547 fixing the block 543 to the stub shaft 531. Secured to the block 543 by cementing is a cap 545, the cap 545 having an outer flange 546 that fits over and receives therein the adjacent end of the pipe 540, a plurality of set screws 547 interconnecting the cap 545 both to the block 543 and the pipe 540.

Disposed in each of the openings 541 and 542 is a watering tube 560 carrying a shield 565, the construction and function of the watering tube 560 and the shield 565 being identical to that of the watering tubes 460 and the shields 465 described above.

As illustrated in FIG. 20, a plurality of blocks of rooting media 550 are provided each in its individual pot 551, the rooting media 550 preferably being of the same construction as the rooting media 150 described above, but having been cast in the pot 551 without the use of a release agent so as to be retained therein, the resin in the rooting media 550 adhesively engaging the inner surfaces of the associated pot 551. Each pot 551 is preferably formed of plastic and has a bottom 552 square in shape and upwardly extending side walls 553, four in number and forming a square opening at the top of the pot 551. Formed centrally in the pot bottom 552 is an opening 554 that communicated with a hole 556 molded in the rooting media 550. One of the watering tubes 560 extends through the opening 554 and into the hole 556 so as to provide water for the rooting media 550 and also to provide for the mounting of the rooting media 550 and associated pot 551 upon the tube 540 for rotation therewith. As is illustrated in FIGS. 21 and 22, adjacent circumferential rows of pots 551 are angularly displaced with respect to each other an angular extent equal to ½ of the angular space occupied by a pot, i.e., ½ of the angular space from center to center of adjacent pots in an annular row, this being 30° as illustrated.

To insure that the pots 551 remain upon the tube 540, and particularly when heavy plants are growing in the rooting media 550, a retainer 570 is provided mechanically and directly to interconnect the pots 551 and the pipe 540. As illustrated the retainer 570 includes a clip 571 having three depending hooks 573 thereon, the central hook 573 being displaced laterally with respect to the end hooks 573, whereby the clip 571 can engage three pots 551 in adjacent annular rows as illustrated in FIG. 22. An eye-bolt 574 is threadedly connected to the pipe 540 and is connected by a spring 575 to the clip 571, the spring 575 continually urging the clip 571 and the connected pots 551 inwardly toward the center of the pipe 540 thus to press the bottoms 552 of the pots 551 against the outer surface of the pipe 540.

In a constructional example of the plant bed 530, the pipe 540 is formed of polyvinyl chloride resin and has an outer diameter of 4 inches and a length of 12 feet. The longitudinal distance between adjacent rows of openings 541 and 542 is 3 inches and each pot 551 has a width of 2½ inches at the bottom thereof and 3 inches at the top thereof.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. Plant growth accelerating apparatus comprising a mounting stand, a plant bed, means to mount said plant bed on said stand for turning about the longitudinal axis of said plant bed, drive structure for turning said plant bed about said longitudinal axis, said longitudinal axis of said plant bed being normally arranged substantially horizontally as said plant bed turns about said longitudinal axis while relatively high light intensities are incident on said plant bed, and means for periodically and alternately tilting the longitudinal axis of said plant bed as said plant bed turns about said longitudinal axis while relatively low light intensities are incident on said plant bed to impart thereto a slope with respect to the horizontal of from about 0.01 to about 0.25 to decrease the respiration rate of plants growing on said plant bed.

2. The plant growth accelerating apparatus set forth in claim 1, wherein said tilting means imparts to the longitudinal axis of said plant bed a slope with respect to the horizontal of about 0.1.

3. The plant growth accelerating apparatus of claim 1, wherein said tilting means includes a detecting system to insure that one end of the mounting stand is lifted only when the other end of the mounting stand is in the lower normal position.

4. The plant gowth accelerating apparatus set forth in claim 1, wherein said tilting means includes a light intensity detector adapted to activate said tilting means when the light intensity incident on said plant bed falls to a predetermined level.

5. The plant growth accelrating apparatus set forth in claim 1, wherein said tilting means includes a first fluid motor moutned adjacent to one end of said mounting stand and a second fluid motor mounted adjacent to the other end of said mounting stand, and a control circuit for said fluid motors for periodically actuating first said first fluid motor and then said second fluid motor to impart to the longitudinal axis of said plant bed a slope upwardly toward said one end thereof and then upwardly toward said other end thereof.

6. The plant growth accelerating apparatus set forth in claim 1, wherein said tilting means includes a first fluid motor mounted adjacent to one end of said mounting stand and a second fluid motor mounted adjacent to the other end of said mounting stand, and a control circuit for said fluid motors for periodically actuating first said first fluid motor and then said second fluid motor to impart to the longitudinal axis of said plant bed a slope upwardly toward said one end thereof and then upwardly toward said other end thereof, said control circuit including a detecting system to insure that said one end of said mounting stand is lifted only when said other end of said mounting stand is in the lower normal position and to insure that said other end of the mounting stand is lifted only when said one end of said mounting stand is in the lower normal position, said control system further including a light intensity detector so as to activate said control circuit to operate said tilting means when the light intensity incident on said plant bed falls to a predetermined level.

7. Plant growth accelerating apparatus comprising a mounting stand, means mounting a plurality of plant beds on said stand for turning about a first longitudinal axis, said plant beds being angularly disposed about said first longitudinal axis and each in turn being mounted for turning about its longitudinal axis, first drive structure for turning said plant beds about said first longitudinal axis, second drive structure for turning each of said plant beds about its longitudinal axis as said plant beds turn about said first longitudinal axis, said longitudinal axes of said plant beds being normally arranged substantially horizontally as said plant beds turn thereabout while relatively high light intensities are incident on said plant beds, and means for periodically and alternately tilting the longitudinal axes of said plant beds as said plant beds turn thereabout while relatively low light intensities are incident on said plant beds to impart thereto a slope with respect to the horizontal of from about 0.01 to about 0.25 to decrease the respiration rate of plants growing on said plant beds.

8. The plant growth accelerating apparatus set forth in claim 7, wherein four plant beds are equiangularly disposed about said first longitudinal axis.

9. The plant growth accelerating apparatus set forth in claim 7, wherein said tilting means imparts to the longitudinal axes of said plant beds a slope with respect to the horizontal of about 0.1.

10. The plant growth accelerating apparatus set forth in claim 7, wherein said tilting means includes a light intensity detector so as to activate siad tilting means when the light intensity incident on said plant beds falls to a predetermined level.

11. The plant growth accelerating apparatus set forth in claim 7, wherein said tilting means includes a first fluid motor mounted adjacent to one end of said mounting stand and a second fluid motor mounted adjacent to the other end of said mounting stand, and a control circuit for said fluid motors for periodically actuating first said first fluid motor and then said second fluid motor to lift one end of said stand and then the other end of said stand to impart to the longitudinal axes of said plant beds a slope upwardly toward said one ends thereof and then upwardly toward said other ends thereof.

12. The plant growth accelerating apparatus set forth in claim 7, wherein said tilting means includes a first fluid motor mounted adjacent to one end of said mounting stand and a secodn fluid motor mounted adjacent to the other end of said mounting stand, and a control circuit for said fluid motors for periodically actuating first said first fluid motor and then said second fluid motor to lift one end of said stand and then the other end of said stand to impart to the longitudinal axis of said plant beds a slope upwardly toward said one ends thereof and then upwardly toward said other ends thereof, said control circuit including a detecting system to insure that said one end of said mounting stand is lifted only when said other end of said mounting stand is in the lower normal position and to insure that said other end of the mounting stand is lifted only when said one end of said mounting stand is in the lower normal position, said control system further including a light intensity detector so as to activate said control circuit to operate said tilting means when the light intensity incident on said plant bed falls to a predetermined level.

13. The plant growth accelerating apparatus set forth in claim 7, wherein said first drive structure turns said plant beds about said first longitudinal axis at a rate of from about one revolution per 5 minutes to about 2 revolutions per minute, and said second drive structure turns each of said plant beds about its longitudinal axis from about one revolution per 200 minutes to one revolution per 10 minutes.

14. Plant growth accelerating apparatus comprising a mounting stand, means mounting a plurality of plant beds on said stand for turning about a first longitudinal axis, said plant beds being angularly disposed about said first longitudinal axis and each in turn being monted for turning about its longitudinal axis, first drive structure for turning said plant beds about said first longitudinal axis, second drive structure for turning each of said plant beds about its longitudinal axis as said plant beds turn about said first longitudinal axis, an annular trough disposed about said first longitudinal axis and radially inwardly with respect to said plant beds and opening inwardly toward said first longitudinal axis to provide in the lower portion of said trough a liquid receptacle, a system for supplying liquids to said trough while said plant beds are being turned about said first longitudinal axis and the respective longitudinal axes of said plant beds, a plurality of connections to said annular trough disposed angularly thereabout and corresponding in number to said plant beds and respectively disposed in angular alignment with said plant beds, and a plurality of conduits respectively interconnecting said connections and the corresponding one of said plant beds for supplying liquids to said plant beds essentially along the longitudinal axes thereof, whereby liquids are periodically supplied to each plant bed by gravity when the plant bed is disposed with the longitudinal axis thereof below the level of liquid in the lower portion of sid trough.

15. The plant growth accelerating apparatus set forth in claim 14, wherein four plant beds are equiangularly disposed about said first longitudinal axis, and four connections are provided in said trough corresponding to said four plant beds.

16. The plant growth accelerating apparatus set forth in claim 15, wherein the liquid supply system includes a valve for controlling the supply of liquid to said trough and a detector for detecting the level of liquid in said trough and operatively connected to said valve for maintaining the liquid in said trough at a predetermined level.

17. The plant growth accelerating apparatus set forth in claim 14, wherein two connections to said trough are provided for each plant bed, and conduits are provided to connect one of said connections to one end of the associated plant bed and the other of said connections to the other end of said plant bed, whereby simultaneously to free liquid to both ends of said plant bed when said connections are below the liquid level in said trough.

18. Plant growth accelerating apparatus comprising a mounting stand, a hollow pipe mounted on said stand for turning about the longitudinal axis thereof, said pipe being adapted to receive thereon a self-supporting cylinder of rooting media having a longitudinal opening therein receiving said pipe extending thereinto, fasteners interconnecting said pipe and the associated cylinder of rooting media to cause the associated cylinder of rooting media to turn with said pipe, said pipe having a plurality of openings in the wall thereof spaced longitudinally therealong and communicating with the associated rooting media, drive structure for turning said pipe about the longitudinal axis thereof and thus to turn the associated rooting media about the longitudinal axis thereof, and a system for supplying liquids to the interior of said pipe and through the openings thereof into the associated rooting media as said pipe and associated rooting media are turned.

19. The plant growth accelerating apparatus set forth in claim 18, wherein said hollow pipe extends the entire length of the associated cylinder of rooting media and the associated rooting media is a single piece.

20. The plant growth accelerating apparatus set forth in claim 18, wherein said fastener includes a plurality of spikes mounted on a disk secured to said pipe for rotation therewith, said spikes engaging longitudinally into the adjacent ends of the associated cylinder of rooting media.

21. Plant growth accelerating apparatus comprising a mounting stand, a hollow pipe mounted on said stand for turning about the longitudinal axis thereof, a plurality of tubes extending outwardly from said pipe along the length thereof and communicating with the interior thereof and having openings therein, said tubes being adapted to receive thereon a self-supporting section of rooting media surrounding said pipe and having openings therein to receive said tubes, the associated section of rooting media receiving liquid from said pipe through said tubes as said pipe and the associated section of rooting media are turned about the longitudinal axis of said pipe, drive structure for turning said pipe about the longitudinal axis thereof and thus to turn the associated section of rooting media about the longitudinal axis of said pipe, and a system for supplying liquids to the interior of said pipe and through said tubes and out of the openings therein into the associated section of rooting media as said pipe and section of rooting media are turned.

22. The plant growth accelerating apparatus set forth in claim 21, wherein said hollow pipe has a relatively small diameter to receive therearound a plurality of sections of rooting media each including a plurality of self-supporting blocks interconnected by flexible straps to accommodate folding of each section about said pipe, at least certain of the blocks having an opening therein receiving one of said tubes to secure associated sections to said pipe.

23. The plant accelerating system set forth in claim 22, and further including a first set of straps extending around the ends of each of the sections and secured to said pipe, thereby further to secure the sections to said pipe.

24. The plant growth accelerating apparatus set forth in claim 23, and further including a second set of straps extending longitudinally of said pipe and covering the juncture between the longitudinal edges of each section and secured to one of said first set of straps.

25. The plant growth accelerating apparatus set forth in claim 21, wherein each of said tubes has said openings in the sides thereof, and a flexible protective strip secured to said tube for movement into protective overlying relation with the associated openings upon insertion of said tube into an associated block of rooting media, thereby to maintain said openings free of obstruction by the rooting media.

26. Plant growth accelerating apparatus comprising a mounting stand, a hollow pipe mounted on said stand for turning about the longitudinal axis thereof, a self-supporting cylinder of rooting media having a longitudinal opening therein and disposed about said pipe with said pipe extending thereinto, fasteners interconnecting said pipe and the said cylinder of rooting media to cause said cylinder of rooting media to turn with said pipe, said pipe having a plurality of openings in the wall thereof spaced longitudinally therealong and communicating with said rooting media, drive structure for turning said pipe about the longitudinal axis thereof and thus to turn said rooting media about the longitudinal axis thereof, and a system for supplying liquids to the interior of said pipe and through the openings thereof into said rooting media as said pipe and said rooting media are turned.

27. The plant growth accelerating apparatus set forth in claim 26, wherein said cylinder of rooting media is of one piece and is essentially circular in cross section.

28. Plant growth accelerating apparatus comprising a mounting stand, a hollow pipe mounted on said stand for turning about the longitudinal axis thereof, a plurality of tubes extending outwardly from said pipe along the length thereof and communciating with the interior thereof and having openings therein, a section of rooting media surrounding at least a portion of said pipe and having openings therein receiving said tubes to mount said section of rooting media upon said pipe, said section of rooting media receiving liquid from said pipe through said tubes as said pipe and said section of rooting media are turned about the longitudinal axis of said pipe, drive structure for turning said pipe about the longitudinal axis thereof and thus to turn said section of rooting media about the longitudinal axis to said pipe, and a system for supplying liquids to the interior of said pipe and through said tubes and out of the openings therein into said section of rooting media as said pipe and said section of rooting media are turned.

29. The plant growth accelerating apparatus set forth in claim 28, wherein said hollow pipe has a relatively small diameter, and a plurality of sections of rooting media are provided surrounding said pipe, each section of rooting media including a plurality of rhomboidal blocks interconnected at the larger ends thereof by flexible straps to accommodate folding of said sections about said pipe, at least certain of said blocks having an opening therein receiving one of said tubes to secure said sections to said pipe.

30. The plant growth accelerating apparatus set forth in claim 29, and further comprising a first set of straps extending around the ends of each of said sections and secured to said pipe, thereby further to secure said sections to said pipe.

31. The plant growth accelerating apparatus set forth in claim 30, and further including a second set of straps extending longitudinally of said pipe and covering the juncture between the longitudinal edges of each of said sections and secured to one of said first set of straps.

32. The plant growth accelerating apparatus set forth in claim 29, wherein said adjacent sections of the rooting media are angularly displaced one-half of the angular extent of one of said rhomboidal blocks with respect to each other to increase the growing space between plants growing from the rooting media thereof.

33. A section of rooting media for use on a plant growth accelerating apparatus having a hollow pipe with a plurality of tubes extending outwardly therefrom along the length thereof and communicating with the interior thereof and having openings therein, said section of rooting media including a body of soil-like material bound by an open-celled hydrophilic polymer of synthetic organic plastic resin, said body being in the form of a plurality of blocks having a generally rhomboidal shape with the adjacent blocks interconnected by flexible sections of limited thickness, said body being deformable by bending at said flexible sections to provide a cylinder extending completely around the associated pipe, each of said blocks having an opening therein receiving one of the associated tubes for mounting said section upon the associated tubes for mounting said section upon the associated pipe and for providing liquid feed thereinto.

34. A rooting media for use on a plant growth accelerating apparatus having a hollow pipe with a plurality of tubes extending outwardly therefrom along the length thereof and communicating with the interior thereof and having openings therein, said rooting media including a pot containing an integral self-supporting body of soil-like material bound by an open-celled hydrophilic polymer of synthetic organic plastic resin and secured thereby to said pot, said pot having an opening in the bottom thereof and said body having an opening in the bottom thereof in alignment with the opening in said pot, said openings being adapted to receive one of said tubes to mount said pot and the body therein upon the associated pipe, the opening in said body being in communication with the opening in the associated tube to provide for liquid feed from the associated pipe through the associated tube into said body of soil-like material.

35. Plant growth accelerating apparatus comprising a mounting stand, a hollow pipe mounted on said stand for turning about the longitudinal axis thereof, a plurality of tubes extending outwardly from said pipe along the length thereof and communicating with the interior thereof and having openings therein, a plurality of plant pots mounted on said pipe and each pot having a body of rooting media therein, each said pot and said body of rooting media having an opening therein receiving one of said tubes, said bodies of rooting media receiving liquid from said pipe through said tubes as said pipe and said pots and said bodies of rooting media are turned about the longitudinal axis of said pipe, drive structure for turning said pipe about the longitudinal axis thereof and thus to turn said pots and said bodies of rooting media about the longitudinal axis of said pipe, and a system for supplying liquids to the interior of said pipe and through said tubes and out of the openings therein into said pots and said bodies of rooting media as said pipe and said pots and said bodies of rooting media are turned.

36. The plant growth accelerating apparatus set forth in claim 35, and further including a plurality of fasteners secured to said pipe and engaging the associated pots resiliently to urge the associated pots against said pipe.

37. the plant growth accelerating apparatus set forth in claim 35, said pots are arranged in rows angularly around said pipe with adjacent rows of pots displaced angularly one-half of the angular distance between two adjacent pots in a row of pots.

38. Plant growth accelerating apparatus comprising a mounting stand, a plant bed mounted on said stand for turning about the longitudinal axis of said plant bed, said longitudinal axis of said plant bed being normally arranged substantially horizontally, drive structure for turning said plant bed about said longitudinal axis, an annular trough associated with said plant bed and disposed about said longitudinal axis and radially inwardly with respect to the plants on said plant bed to provide in the lower portion of said trough a liquid receptacle, and connections from said annular trough to said plant bed so that liquids are fed by gravity from said trough to plants on said plant bed as the plants turn to a position lower than the liquid level in said trough.

39. A method of accelerating the growth of plants comprising the steps of providing an elongated plant bed mounted for turning about the logitudinal axis thereof, turning said plant bed about its longitudinal axis and maintaining said longitudinal axis substantially horizontal while relatively high light intensities are incident on said plant bed, and turning said plant bed about its longitudinal axis and periodically and alternately tilting the longitudinal axis of said plant bed while relatively low light intensities are incident on said plant bed to impart thereto a slope with respect to the horizontal of from about 0.01 to about 0.25 to decrease the respiration rate of plants growing on said plant bed.

40. A method of accelerating the growth of plants comprising the steps of providing an elongated plant bed mounted for turning about the longitudinal axis thereof, turning said plant bed about its longitudinal axis and maintaining said longitudinal axis substantially horizontal while relatively high light intensities are incident on said plant bed, turning said plant bed about its longitudinal axis and alternately tilting the longitudinal axis of said plant bed while relatively low light intentsities are incident on said plant bed to impart thereto a slope with respect to the horizontal of from about 0.01 to about 0.25 to decrease the respiration rate of plants growing on said plant bed, and periodically supplying liquids to said plant bed essentially along the longitudinal axis thereof and into plant bed while said plant bed is being turned about its longitudinal axis.

\* \* \* \* \*